United States Patent Office 3,077,462
Patented Feb. 12, 1963

3,077,462
ISOCYANATE-POLYVINYL FORMAL RESIN COMPOSITION AND COATED WIRE
Andrew F. Fitzhugh, Longmeadow, and Edward Lavin and Robert N. Crozier, Springfield, Mass., assignors, by direct and mesne assignments, of one-half to Shawinigan Resins Corporation, Springfield, Mass, a corporation of Massachusetts, and of one-half to Phelps Dodge Copper Products Corporation, New York, N.Y., a corporation of Delaware
No Drawing. Filed Mar. 15, 1955, Ser. No. 494,535
13 Claims. (Cl. 260—33.4)

This invention relates, to resinous compositions especially adapted to serve as electrical insulation for metals. More particularly, the invention relates to compositions of polyvinyl acetals reacted with certain polyurethanes and to wires coated with these compositions.

A number of important uses have developed for polyvinyl acetals since their discovery over twenty years ago. The insulation of electrical conductors with polyvinyl formals modified with phenol-aldehyde resins is one of the major commercial applications. These insulating coatings are used for approximately 70% of the magnet wires manufactured in this country. Nonetheless in certain applications a need exists for a wire enamel possessing greater dielectric breakdown strength in the presence of moisture, greater resistance to the solvent action of certain refrigerants such as chlorodifluoromethane (CHClF$_2$), and one which will permit the ready soldering of coated wires at temperatures below 500° C.

An object of this invention is to provide resinous compositions of urethane modified polyvinyl acetals. Another object is to provide a wire coated with such compositions.

A further object of this invention is to provide in one system a new insulating enamel which has the desirable properties of the present polyvinyl formal-phenolic compositions and in addition possesses the desired characteristics referred to above.

These and other objects are attained by reacting polyvinyl acetals with a polyurethane represented by the general formula

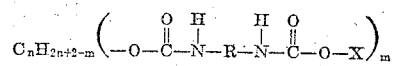

where R represents a member of the class consisting of phenylene, methyl phenylene, naphthylene and methyl naphthylene groups, X represents a member of the class consisting of phenyl and alkyl phenyl groups, said alkyl groups containing 1-6 carbon atoms, $m$ is an integer greater than 1 but not greater than $n$, and $n$ is an integer from 2-10. These particular polyurethanes are aliphatic, aromatic polyesters of aromatic dicarbamic acids.

This invention is illustrated but not limited by the following examples in which the parts are by weight.

EXAMPLE I

A polyvinyl formal resin was used having the following analysis:

10.5% acetate groups calculated as polyvinyl acetate
6.0% hydroxyl groups calculated as polyvinyl alcohol
83.5% formal groups calculated as polyvinyl formal (by difference)

One hundred parts of this resin and 133 parts of a polyurethane represented by the formula

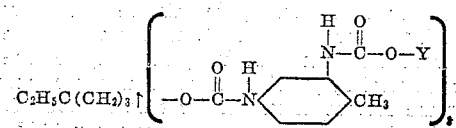

where Y is a methyl phenyl group, were dissolved in a mixture of 440 parts of high solvency petroleum hydrocarbon (B.P. 150–184° C., composed principally of alkyl benzenes) and 258 parts of a commercial cresylic acid (B.P. 207–223° C.). The solution was amber colored and had a viscosity of about 80 poises at 20° C.

Six coats of this enamel were applied to 0.05 inch diameter annealed bright copper wire by running the wire through the solution and then through spring clip dies. After each coating, the wire was passed through a vertical oven 12 feet high at a speed of 8 ft./min., the hottest portion being approximately four feet long and having a temperature of about 335° C. The enamelled wire so produced is classified by the National Electrical Manufacturers' Association as HF wire, the increase in diameter due to coating being within the range of 2.6 to 3.5 mils.

Enamelled wires were prepared in a like manner using the formulae shown in Examples II–IX (Table 1).

Table 1

|  | Examples |  |  |  |  |  |  |  |
|---|---|---|---|---|---|---|---|---|
|  | II | III | IV | V | VI | VII | VIII | IX |
| Polyvinyl formal of Ex. I | 100. | 100 | 100 | 100 |  | 100 |  | 100 |
| Polyvinyl formal "A" |  |  |  |  | 100 |  | 100 |  |
| Polyurethane of Ex. I | 45 | 22 | 266 | 33 | 43 |  |  |  |
| Polyester resin |  |  | 67 |  |  |  |  |  |
| Phenolic resin |  |  |  | 25 |  |  |  | 100 |
| High solvency petroleum hydrocarbon | 273 | 230 | 635 | 440 | 480 | 374 | 391 | 440 |
| Commercial cresylic acid | 160 | 135 | 324 | 202 | 252 | 219 | 229 | 258 |

The polyvinyl formal "A" resin had an analysis of 13.0% acetate groups and 7.6% alcohol groups, the balance being formal groups.

The polyester resin was a liquid, low molecular weight alkyd, highly branched and having several OH groups per molecule.

The phenolic resin was a soluble, fusible, heat-hardenable phenol-formaldehyde reaction product dissolved in an equal weight of cresylic acid.

Example IX illustrates the commercially available high quality insulated magnet wires of the present time.

The enamelled wires of Examples I–IX passed the standards of the National Electrical Manufacturers' Association (NEMA) for vinyl acetal magnet wire as to flexibility and adhesion. Results of other standard tests on these coated wires are shown in Tables 2 and 3.

Table 2

| Ex. No. | Build (mils) | Dielectric Strength, dry | (volts/mil) wet | CHClF$_2$ Blistering Test | Tinning Time seconds at 450° C. |
|---|---|---|---|---|---|
| I | 2.9 | 2,700 | 2,300 | 1 | 6 |
| II | 2.8 | 2,900 | 2,400 | 1 | 25 |
| III | 2.7 | 2,900 | 1,800 | 1 | 20 |
| IV | 3.2 | 2,700 | 2,700 | 1–2 | 10 |
| V | 2.8 |  |  | 1 | 45 |
| VI | 2.6 | 2,900 | 2,300 | 1 | 11 |
| VII | 3.3 | 2,300 | 1,800 | 2 | 15 |
| VIII | 2.2 | 2,300 | 1,400 | 4 | 40 |
| IX | 2.7 | 2,500 | 1,400 | 4 | 60 |

*Build.*—The addition to the diameter of the bare wire, in thousandths of an inch, is measured by means of a micrometer caliper.

*Dielectric strength, dry.*—Pairs of wires were twisted together 9 turns over a distance of 4.75" under a tension of 3 pounds. Specimens were conditioned over dried silica gel for 3 days. Voltage was then applied between the wires and increased at the rate of 500 volts per second until the insulation was broken down by an arc. The breakdown voltage was then divided by the coating build in mils. The results shown are the average of three tests.

*Dielectric strength, wet.*—The test was similar to the dry test. However, the twisted wires were conditioned by immersion in water at 25° C. for 24 hours. The wires were removed from the water and tested directly.

*$CHClF_2$ blistering test.*—Specimens were placed in a bomb of about 300 cc. capacity and 50 cc. refrigerator oil and 50–75 g. $CHClF_2$ were added. The bomb was kept at 40° C. for 16 hours, opened, and the specimens immediately placed in an oven at 125° C. After 15 minutes the wires were removed, cooled and examined. The resistance of the coating to $CHClF_2$ was rated on a scale from 1 (intact) to 6 (continuous blistering).

*Tinning time.*—Solderability was tested by immersing at least 1" of a specimen of the coated wire in a mixture of equal parts of tin and lead held at 450° C. The time reported is that required to remove sufficient insulation to tin the copper for at least ½" from the tip.

*Table 3*

| Ex. No. | Abrasion Strokes, 780 g. wgt. | Cut-Through Temp., °C. | Methanol Extract, Percent | Toluene Resistance |
|---|---|---|---|---|
| I | 68 | 295 | 0.22 | 100+ |
| II | 96 | 249 | 0.55 | 100+ |
| III | 50 | | | 100+ |
| IV | 80 | | | 100+ |
| V | 96 | | | 100+ |
| VI | 89 | 259 | 0.94 | 100+ |
| VII | 60 | 232 | 1.3 | 2 |
| VIII | ¹3 | 182 | 9.0 | 3 |
| IX | 93 | 208 | 2.1 | 100+ |

¹ Abrasion with a 550 g. weight wore through the coating in 46 strokes.

*Abrasion resistance.*—A specimen was wiped with a clean cloth and then elongated about 1% to remove kinks. A NEMA-General Electric Abrasion Scrape Tester repeatedly scraped the specimen with the cylindrical surface of a steel needle 0.016" in diameter, for a length of ⅜", at a rate of 60 strokes per minute until the coating was worn through. A weight of 780 g. was applied through the needle.

*Cut-through temperature.*—A load of 5 pounds was applied at the junction of two pieces of enamelled wire crossing at 90.° The temperature was raised at a rate of 10° C. per minute until shorting of the junction closed a twelve volt bell circuit.

*Methanol extract.*—A 20 g. specimen was dried and weighed (A). It was then immersed in 150 ml. boiling methanol for two hours, rinsed in fresh methanol, dried and re-weighed (B). The coating was then stripped off and the bare wire dried and weighed (C). Methanol extract, $$\text{Percent} = \frac{100(A-B)}{A-C}$$

*Toluene resistance.*—Specimens were immersed 24 hours in toluene at 25° C., then placed in a NEMA-G.E. Abrasion Tester under a 400 g. load until the coating was worn through.

The resinous compositions of this invention may be the reaction product of 100 parts by weight of a polyvinyl acetal and 18–400 parts by weight of a polyurethane. For insulative wire coating compositions it is preferred to react 100 parts of a polyvinyl formal with 43–150 parts of a polyurethane.

The polyurethanes of this invention may be prepared by reacting a polyhydric alcohol with an equivalent amount of a reaction product of one mol of a monohydric phenol with one mole of arylene diisocyanate. The polyhydric alcohols are in general preferably limited to compounds containing not more than 16 carbon atoms. For use in wire enamels, the polyhydric alcohols should contain not more than 10 carbon atoms. Examples of these alcohols are ethylene glycol, propylene glycol, glycerol, trimethylol propane, pentaerythritol, one of the isomeric hexanetriols, etc. The monohydric phenol may be an aryl compound such as phenol, cresols, xylenols and ethyl phenol. Useful diisocyanates are arylene compounds such as tolylene diisocyanate, phenylene diisocyanate, naphthylene diisocyanate and diphenylmethane diisocyanate.

The polyvinyl formals useful in this invention are obtained by reacting polyvinyl alcohol or a partially hydrolyzed polyvinyl ester with formaldehyde. Polyvinyl formals contain a certain number of hydroxyl groups and may contain a certain number of ester groups depending upon the extent of the hydrolysis and acetalation reactions. The preferred polyvinyl formal resins contain on a weight basis, 1–35% ester groups calculated as polyvinyl ester, 3–15% hydroxyl groups calculated as polyvinyl alcohol and the balance substantially formaldehyde acetal. In the commercial polyvinyl formals, the ester groups are acetate groups. Other polyvinyl acetals such as the reaction products of hydrolyzed polyvinyl esters with acetaldehyde, propionaldehyde, butyraldehyde and benzaldehyde, may be reacted with the polyurethanes of this invention.

To be used as a coating composition, the polyvinyl formals and polyurethanes should be dissolved in a substantially anhydrous organic solvent medium. The solvent medium should contain a substantial amount of a phenol such as phenol, cresols, xylenols, and a aliphatic or aromatic hydrocarbon such as xylene, naphtha and mixtures such as the high solvency petroleum hydrocarbon used in the examples.

The coatings may be applied on metals such as copper, aluminum, zinc, alloys of these metals, or copper plated with nickel, cobalt or tin, by conventional wire coating means.

Polyvinyl formals and the polyurethanes used in this invention are both stable when in the dry state. A solution of these materials in an inert substantially anhydrous solvent system at room temperature is also stable. However, no initiator other than heat is required to accomplish the reaction of the resins. The reaction initiates at temperatures above about 150° C., however, a temperature of at least 200° C. is preferred for faster reactions. In the examples, the reactions took place in about 1½ minutes at a temperature averaging less than 335° C.

Various other resinous materials, such as phenolic resins, polyesters, polyamides or rosin derivatives may be added to the resin of this invention. These materials may be used to vary the properties of the finished products to some extent. Other conventional additives such as fillers, pigment dyes, lubricants, etc., may also be added either to the dry starting materials or to the solutions of reactants.

The resins of this invention form valuable insulative coatings both on magnet wires and in other applications such as, for example, foil condensers. These coatings are smooth, glossy, tough, adhere well to metals, are resistant to solvents and abrasion, and are superior to conventional wire enamels in solderability, resistance to refrigerants such as $CHClF_2$ and show less loss of dielectric strength on exposure to moisture.

Moldings may also be formed from these resinous compositions by mixing the reactants in a dry, finely powdered form and thereupon curing the mixture at temperatures above 150° under pressure. Cast articles may be prepared from solutions containing the polyurethane and polyvinyl acetal by pouring the solution into a mold, removing the solvent at temperatures below 150° C. and then curing the casting at temperatures above 150° C.

What is claimed is:

1. A coating composition comprising an organic solvent solution of 100 parts by weight of a polyvinyl acetal and 18–400 parts by weight of a polyurethane represented by the general formula

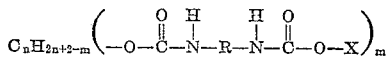

where R represents a member of the class consisting of phenylene, methyl phenylene, naphthylene and methyl naphthylene groups, X represents a member of the class consisting of phenyl and alkyl phenyl groups, said alkyl groups containing 1–6 carbon atoms, $m$ is an integer greater than 1 but not greater than $n$, and $n$ is an integer from 2–10, said solvent comprising a substantial amount of (1) a compound selected from the group consisting of phenol, cresols and xylenols and (2) a compound taken from the class consisting of aliphatic and aromatic hydrocarbons.

2. A coating composition as in claim 1 wherein the polyvinyl acetal is polyvinyl formal.

3. A coating composition comprising an organic solvent solution of 100 parts of polyvinyl formal and 43–150 parts of a polyurethane represented by the formula

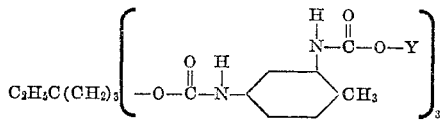

where Y is a methyl phenyl group, said solvent comprising a substantial amount of (1) a compound selected from the group consisting of phenol, cresols and xylenols and (2) a compound taken from the class consisting of aliphatic and aromatic hydrocarbons.

4. A composition comprising the cured resinous product of heating, at above 150° C., 100 parts of a polyvinyl acetal and 18–400 parts of a polyurethane represented by the general formula

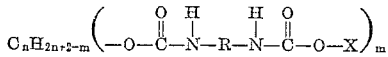

where R represents a member of the class consisting of phenylene, methyl phenylene, naphthylene and methyl naphthylene groups, X represents a member of the class consisting of phenyl and alkyl phenyl groups, said alkyl groups containing 1–6 carbon atoms, $m$ is an integer greater than 1 but not greater than $n$, and $n$ is an integer from 2–10.

5. A composition as in claim 4 wherein the polyvinyl acetal is polyvinyl formal.

6. A composition comprising the cured resinous product of heating, at above 150° C., 100 parts of polyvinyl formal and 43–150 parts of a polyurethane represented by the general formula

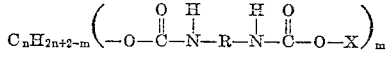

where R represents a member of the class consisting of phenylene, methyl phenylene, naphthylene and methyl naphthylene groups, X represent a member of the class consisting of phenyl and alkyl phenyl groups, said alkyl groups containing 1–6 carbon atoms, $m$ is an integer greater than 1 but not greater than $n$, and $n$ is an integer from 2–10.

7. A composition comprising the cured resinous reaction product produced by heating at temperatures over 200° C., an organic solvent solution containing 100 parts of polyvinyl formal and 43–150 parts of a polyurethane represented by the formula

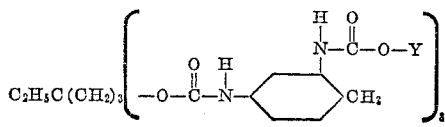

where Y is a methyl phenyl group, said solvent comprising a substantial amount of (1) a compound selected from the group consisting of phenol, cresols and xylenols and (2) a compound taken from the class consisting of aliphatic and aromatic hydrocarbons.

8. A composition comprising the cured resinous reaction product of heating at temperatures over 200° C., an organic solvent solution containing 100 parts of polyvinyl formal and 43 parts of a material represented by the formula

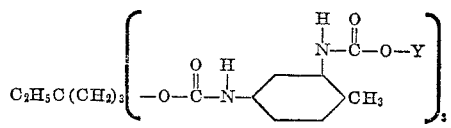

where Y is a methyl phenyl group, said solvent comprising a substantial amount of (1) a compound selected from the group consisting of phenol, cresols and xylenols and (2) a compound taken from the class consisting of aliphatic and aromatic hydrocarbons.

9. A process for preparing a cured resinous product which comprises heating at a temperature above about 150° C., an organic solvent solution containing 100 parts of polyvinyl formal resin and 18–400 parts of a polyurethane represented by the general formula

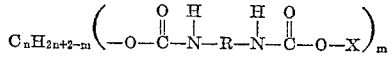

where R represents a member of the class consisting of phenylene, methyl phenylene, naphthylene and methyl naphthylene groups, X represents a member of the class consisting of phenyl and alkyl phenyl groups, said alkyl groups containing 1–6 carbon atoms, $m$ is an integer greater than 1 but not greater than $n$, and $n$ is an integer from 2–10, said solvent comprising a substantial amount of (1) a compound selected from the group consisting of phenol, cresols and xylenols and (2) a compound taken from the class consisting of aliphatic and aromatic hydrocarbons.

10. A process for insulating wire which comprises coating the wire with an organic solvent solution comprising 100 parts of polyvinyl formal and 43–150 parts of a polyurethane represented by the general formula

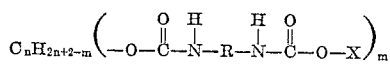

where R represents a member of the class consisting of phenylene, methyl phenylene, naphthylene and methyl naphthylene groups, X represents a member of the class consisting of phenyl and alkyl phenyl groups, said alkyl groups containing 1–6 carbon atoms, $m$ is an integer greater than 1 but not greater than $n$, and $n$ is an integer from 2–10, said solvent comprising a substantial amount of (1) a compound selected from the group consisting of phenol, cresols and xylenols and (2) a compound taken from the class consisting of aliphatic and aromatic hydrocarbons, and thereafter simultaneously removing the solvent from the coating and curing the coating on the wire at a temperature of at least 200° C.

11. The insulated wire produced by the process of claim 10.

12. A wire coated with a composition which is the reaction product of 100 parts by weight polyvinyl formal and 43 to 150 parts by weight of the urethane of the formula:

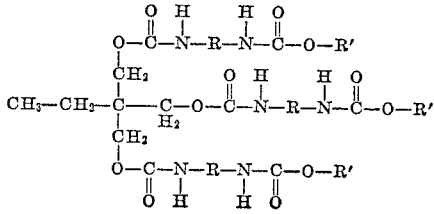

wherein R′ is a phenyl radical and R is a methyl phenylene radical.

13. An electrical conductor insulated with a hard, flexible, tough and abrasion-resistant coating comprising a cured mixture of 20–80 parts of a reactive isocyanate, 10–70 parts of a polyvinyl formal, and 10–40 parts of a polyester, said coating being cured on the conductor.

References Cited in the file of this patent

UNITED STATES PATENTS 2,532,011    Dahlquist et al. ——————— Nov. 28, 1950